United States Patent
Zhu et al.

(10) Patent No.: US 12,224,604 B2
(45) Date of Patent: Feb. 11, 2025

(54) CHARGE CONTROL CIRCUIT, CHARGING DEVICE AND CHARGING SYSTEM

(71) Applicant: Globe (Jiangsu) Co., Ltd., Changzhou (CN)

(72) Inventors: Yanqiang Zhu, Changzhou (CN); Yanliang Zhu, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 601 days.

(21) Appl. No.: 17/347,554

(22) Filed: Jun. 14, 2021

(65) Prior Publication Data
US 2021/0399555 A1    Dec. 23, 2021

(30) Foreign Application Priority Data
Jun. 18, 2020    (CN) .......................... 202010558032.9

(51) Int. Cl.
*B60L 58/20* (2019.01)
*B60L 53/65* (2019.01)
(Continued)

(52) U.S. Cl.
CPC ............ *H02J 7/0019* (2013.01); *B60L 58/20* (2019.02); *H01M 10/4221* (2013.01);
(Continued)

(58) Field of Classification Search
CPC .... H02J 7/0019; H02J 7/00047; H02J 7/0048; H01M 10/4221; H02M 3/33561; B60L 58/20
(Continued)

(56) References Cited

U.S. PATENT DOCUMENTS 3,310,739 A * 3/1967 Medlar .................. G01R 15/08
327/494
6,304,059 B1 * 10/2001 Chalasani ................. H02J 7/34
320/118
(Continued)

FOREIGN PATENT DOCUMENTS

CN    206023324 U    3/2017
CN    108808754 A    11/2018
(Continued)

OTHER PUBLICATIONS

EPO Examination opinion for EP Application 21179813.7 (same family as this application), filed online Nov. 17, 2021 (Year: 2021).*

*Primary Examiner* — John T Trischler (57) ABSTRACT

The present disclosure provides a charge control circuit, a charging device and a charging system. The charge control circuit comprises a power input end, a power output end, a switch unit, a control unit and a detection unit, wherein rechargeable batteries comprise a first rechargeable battery and a second rechargeable battery; the power output end comprises a first power output end and a second power output end; the switch unit comprises a first switch and a second switch; a voltage adjustment circuit is connected between the first switch and the first power output end; and when the detection unit detects that the rated voltages of the rechargeable batteries are not the same, the control unit controls the second switch to be closed and the second rechargeable battery is charged, and at the same time the control unit controls the first switch to be closed and activates the voltage adjustment circuit.

9 Claims, 3 Drawing Sheets

US 12,224,604 B2

Page 2

(51) Int. Cl.

| | |
|---|---|
| *H01M 10/42* | (2006.01) |
| *H02J 7/00* | (2006.01) |
| *H02M 3/335* | (2006.01) |
| B60L 58/18 | (2019.01) |
| H01M 6/50 | (2006.01) |
| H01M 10/44 | (2006.01) |
| H02J 1/10 | (2006.01) |
| H02M 1/00 | (2006.01) |
| H02M 3/158 | (2006.01) |

(52) U.S. Cl.
CPC ........ *H02J 7/00047* (2020.01); *H02J 7/0048* (2020.01); *H02M 3/33561* (2013.01); B60L 53/65 (2019.02); B60L 58/18 (2019.02); H01M 6/5066 (2013.01); H01M 10/441 (2013.01); H02J 1/102 (2013.01); H02J 7/0013 (2013.01); H02J 2207/20 (2020.01); H02M 1/007 (2021.05); H02M 3/1582 (2013.01); H02M 3/1584 (2013.01)

(58) Field of Classification Search
USPC .......................................... 320/119, 125, 137
See application file for complete search history.

(56) References Cited

U.S. PATENT DOCUMENTS

| | | | | |
|---|---|---|---|---|
| 6,777,913 | B2* | 8/2004 | You | H02J 7/0013 320/125 |
| 6,835,491 | B2* | 12/2004 | Gartstein | H01M 6/5044 429/61 |
| 7,039,821 | B1* | 5/2006 | Potega | G06F 1/26 713/340 |
| 7,064,521 | B2* | 6/2006 | Stanesti | H02J 7/02 320/149 |
| 7,127,623 | B2* | 10/2006 | Potega | G06F 1/263 713/300 |
| 7,414,381 | B2* | 8/2008 | Popescu-Stanesti | H02J 7/0018 320/149 |
| 8,319,545 | B2* | 11/2012 | Sousa | H02M 3/07 327/536 |
| 8,504,218 | B2* | 8/2013 | Mollet | B60L 50/61 701/19 |
| 8,643,325 | B2* | 2/2014 | Yang | H02J 7/0068 320/111 |
| 8,754,543 | B2* | 6/2014 | Svensson | H02J 3/32 307/46 |
| 8,847,532 | B2* | 9/2014 | Miyazaki | B25F 5/00 318/560 |
| 8,901,884 | B2* | 12/2014 | Maleus | H02J 7/0014 320/132 |
| 9,187,000 | B2* | 11/2015 | Kuwano | H02J 7/0019 |
| 9,242,567 | B2* | 1/2016 | Kim | H02J 7/02 |
| 9,300,148 | B2* | 3/2016 | Oh | H02J 7/0013 |
| 9,755,440 | B2* | 9/2017 | Ishibashi | H02J 7/0018 |
| 10,020,658 | B2* | 7/2018 | Purcarea | H02J 7/0013 |
| 10,056,755 | B2* | 8/2018 | Li | H02M 3/158 |
| 10,063,066 | B2* | 8/2018 | Zane | H02J 7/0068 |
| 10,211,488 | B2* | 2/2019 | Willgert | H01M 10/46 |
| 10,250,059 | B2* | 4/2019 | Aldehayyat | H02J 7/0068 |
| 10,277,041 | B2* | 4/2019 | Zane | H02J 7/0016 |
| 10,298,026 | B2* | 5/2019 | Trimboli | H02M 3/3507 |
| 10,326,296 | B2* | 6/2019 | Pullen | G06F 1/26 |
| 10,447,161 | B2* | 10/2019 | Bayer | H02M 1/08 |
| 10,457,151 | B2* | 10/2019 | Ha | B60L 50/51 |
| 10,574,144 | B1* | 2/2020 | Ramabhadran | H02M 1/14 |
| 10,587,128 | B2* | 3/2020 | Zheng | H02J 7/0013 |
| 10,847,991 | B2* | 11/2020 | He | H02J 7/00 |
| 11,095,122 | B2* | 8/2021 | Takemoto | B60L 58/20 |
| 11,211,665 | B2* | 12/2021 | Lu | H02J 7/0024 |
| 11,289,783 | B2* | 3/2022 | Mao | H01M 50/213 |
| 11,299,138 | B2* | 4/2022 | Shokaku | F02N 11/0866 |
| 11,322,936 | B2* | 5/2022 | Zhou | H02J 7/00 |
| 11,374,429 | B2* | 6/2022 | Wood | H02J 7/345 |
| 11,524,596 | B2* | 12/2022 | Cheng | B60L 53/65 |
| 11,600,884 | B2* | 3/2023 | Lu | H02J 7/0063 |
| 11,642,981 | B1* | 5/2023 | Rogers | B60L 53/53 320/104 |
| 11,664,540 | B2* | 5/2023 | Mao | H01M 50/503 173/217 |
| 11,695,165 | B2* | 7/2023 | Kim | H01M 10/482 320/136 |
| 11,699,957 | B2* | 7/2023 | Zhang | B60L 53/24 307/19 |
| 11,721,986 | B2* | 8/2023 | Li | H02J 7/0031 320/134 |
| 11,804,722 | B2* | 10/2023 | Wang | H02J 9/061 |
| 2006/0005055 | A1* | 1/2006 | Potega | G06F 1/263 713/300 |
| 2006/0244420 | A1* | 11/2006 | Stanesti | H02J 7/0025 320/128 |
| 2009/0037038 | A1* | 2/2009 | Mollet | B60L 50/61 701/19 |
| 2009/0045775 | A1* | 2/2009 | Popescu Stanesti | H02J 7/34 320/126 |
| 2010/0181829 | A1* | 7/2010 | Ichikawa | H01M 10/425 307/9.1 |
| 2011/0089763 | A1* | 4/2011 | Svensson | H02M 7/797 307/80 |
| 2011/0204959 | A1* | 8/2011 | Sousa | H02M 3/07 327/536 |
| 2011/0227537 | A1* | 9/2011 | Maleus | H02J 7/1423 320/116 |
| 2012/0146588 | A1* | 6/2012 | Ishibashi | H02J 7/0018 320/138 |
| 2012/0175966 | A1* | 7/2012 | Nakashima | H02J 7/0019 307/86 |
| 2012/0235626 | A1* | 9/2012 | Oh | H02M 3/3353 320/103 |
| 2012/0235641 | A1* | 9/2012 | Yang | H02J 7/0024 320/110 |
| 2013/0002203 | A1* | 1/2013 | Kuraishi | H02J 7/0019 320/134 |
| 2013/0015789 | A1* | 1/2013 | Miyazaki | B25F 5/00 318/139 |
| 2013/0106369 | A1* | 5/2013 | Arunachalam | G05B 19/0423 323/234 |
| 2013/0271077 | A1* | 10/2013 | Kim | B60L 53/22 320/109 |
| 2014/0077731 | A1* | 3/2014 | Kuwano | H02J 7/0014 320/126 |
| 2015/0214757 | A1* | 7/2015 | Zane | H02J 7/0016 320/107 |
| 2015/0298571 | A1* | 10/2015 | Kim | B60L 15/007 903/907 |
| 2015/0311730 | A1* | 10/2015 | Aradachi | H02J 7/0024 320/134 |
| 2015/0357684 | A1* | 12/2015 | Willgert | H01M 50/213 320/112 |
| 2015/0372499 | A1* | 12/2015 | Purcarea | H02J 7/02 307/104 |
| 2016/0185237 | A1* | 6/2016 | Ha | B60L 1/00 307/10.1 |
| 2016/0294182 | A1* | 10/2016 | Li | B60L 58/20 |
| 2016/0336765 | A1* | 11/2016 | Trimboli | H02J 7/0068 |
| 2016/0336767 | A1* | 11/2016 | Zane | H02J 7/0048 |
| 2017/0222464 | A1* | 8/2017 | Pullen | G06F 1/266 |
| 2018/0083470 | A1* | 3/2018 | Aldehayyat | H02M 3/1582 |
| 2018/0123362 | A1* | 5/2018 | Zheng | H02J 7/0013 |
| 2018/0191183 | A1* | 7/2018 | Namiki | H05K 7/20145 |
| 2018/0287496 | A1* | 10/2018 | Bayer | H02M 3/1582 |
| 2019/0267827 | A1* | 8/2019 | He | H02J 7/342 |
| 2020/0001735 | A1* | 1/2020 | Cheng | B64U 10/13 |
| 2020/0062140 | A1* | 2/2020 | Zhou | B60L 50/64 |
| 2020/0176724 | A1* | 6/2020 | Mao | H01M 50/512 |
| 2020/0176827 | A1* | 6/2020 | Mao | H01M 50/519 |
| 2020/0185941 | A1* | 6/2020 | Lee | H02J 7/00047 |
| 2020/0298820 | A1* | 9/2020 | Shokaku | B60W 20/00 |
| 2021/0006066 | A1* | 1/2021 | Takemoto | H02J 1/102 |

(56) References Cited

U.S. PATENT DOCUMENTS

| | | | |
|---|---|---|---|
| 2021/0111567 A1* | 4/2021 | Wang | H02J 7/0047 |
| 2021/0119277 A1* | 4/2021 | Kim | H02J 7/0019 |
| 2021/0152007 A1* | 5/2021 | Li | H02J 7/00306 |
| 2021/0181258 A1* | 6/2021 | Li | H01M 10/425 |
| 2021/0384739 A1* | 12/2021 | Wang | H02J 7/007 |
| 2022/0077533 A1* | 3/2022 | Lu | H01M 10/4207 |
| 2022/0094192 A1* | 3/2022 | Wood | H02J 1/122 |
| 2022/0131570 A1* | 4/2022 | Zhu | H04L 69/08 |
| 2022/0197295 A1* | 6/2022 | Xu | G05D 1/0214 |
| 2022/0286057 A1* | 9/2022 | Zhang | H02M 7/5387 |
| 2023/0238814 A1* | 7/2023 | Lu | H01M 10/613 |
| | | | 320/107 |
| 2023/0292657 A1* | 9/2023 | Xu | G05D 1/0214 |
| 2023/0327565 A1* | 10/2023 | Zhang | B60L 58/20 |
| | | | 307/19 |

FOREIGN PATENT DOCUMENTS

| | | | | |
|---|---|---|---|---|
| DE | 102014006746 A1 * | 11/2015 | | B60L 11/18 |
| EP | 2874270 A1 | 5/2015 | | |
| GB | 2501904 A | 11/2013 | | |
| JP | 2014117054 A * | 6/2014 | | H02J 7/0006 |
| WO | WO-2022194433 A1 * | 9/2022 | | |

* cited by examiner

CHARGE CONTROL CIRCUIT, CHARGING DEVICE AND CHARGING SYSTEM

CROSS REFERENCE TO RELATED APPLICATION

The present application is based on, and claims the priority from, Chinese application number CN202010558032.9, filed on Jun. 18, 2020, the disclosure of which is hereby incorporated by reference herein in its entirety.

FIELD OF TECHNOLOGY

The present disclosure relates to the field of battery charging technology, in particular to a charge control circuit, a charging device and a charging system.

BACKGROUND

Currently, most electronic devices such as portable mobile terminals, cameras, and photographic equipment are provided with a plurality of rechargeable batteries, and when the batteries run out of power, the plurality of batteries need to be charged by using a charger.

A common charging method in the market at present is connecting a plurality of rechargeable batteries in parallel to charge them in a unified manner. However, such a method has many shortcomings. For example, after rechargeable batteries with different voltage values are connected in parallel, batteries with higher voltage may discharge to batteries with lower voltage, generally with a very large discharge current, which results in risks. In addition, after the plurality of rechargeable batteries are connected in parallel, when the temperatures and cell states of the batteries are not the same during the charging process, output charging currents cannot be adjusted according to the conditions of the different batteries.

In view of this, there is indeed a need to improve the existing charge control circuit to solve the above problems.

SUMMARY

An object of the present disclosure is to provide a charge control circuit, a charging device with the charge control circuit, and a charging system. With the charge control circuit, not only can a plurality of rechargeable batteries be charged simultaneously, but also charging currents of the plurality of rechargeable batteries can be adjusted to be the same when voltages of the plurality of rechargeable batteries are not same.

To achieve the above object, the present disclosure provides a charge control circuit, including:

a power input end;

a power output end configured to be connected with batteries to charge the batteries;

a switch unit connected between the power input end and the power output end, to control the power output end to be turned on or off;

a control unit electrically connected with the switch unit, to control the switch unit to be closed or opened; and a detection unit connected with the control unit, to detect rated voltages of the batteries and transmit a detection result to the control unit, wherein the batteries are a plurality of rechargeable batteries and at least include a first rechargeable battery and a second rechargeable battery; the power output end includes a first power output end connected to the first rechargeable battery and a second power output end connected to the second rechargeable battery; the switch unit includes a first switch connected to the first power output end and a second switch connected to the second power output end; a voltage adjustment circuit is further connected between the first switch and the first power output end; and when the detection unit detects that the rated voltages of the first rechargeable battery and the second rechargeable battery are not the same, the control unit controls the second switch to be closed and the second rechargeable battery is charged, and at the same time the control unit controls the first switch to be closed and activates the voltage adjustment circuit for voltage adjustment, so that the first rechargeable battery is charged simultaneously, and the charging currents of the first rechargeable battery and the second rechargeable battery are same.

As a further improvement of the present disclosure, the voltage adjustment circuit includes a buck circuit and a boost circuit, the buck circuit and boost circuit being respectively connected with the control unit, the buck circuit and boost circuit being connected in parallel with each other between the first switch and the first power output end.

As a further improvement of the present disclosure, a reverse cut-off rectifier tube is connected between the buck circuit and the first power output end, and a reverse cut-off rectifier tube is also connected between the boost circuit and the first power output end, the buck circuit and boost circuit being both DC-DC control circuits.

As a further improvement of the present disclosure, the detection unit includes a voltage detection unit and a current detection unit; the voltage detection unit is connected with the control unit, to detect the rated voltage of each charging battery and transmit a detection result to the control unit; and the current detection unit is connected with the control unit, to detect a total charging current and a charging current of each rechargeable battery and transmit a detection result to the control unit.

As a further improvement of the present disclosure, the current detection unit includes a first resistor connected to the power input end, a second resistor connected in series with the first resistor, a third resistor connected in parallel with the second resistor, a first current detector connected to two ends of the first resistor, a second current detector connected to two ends of the second resistor, and a third current detector connected to two ends of the third resistor, wherein the first current detector, the second current detector and the third current detector are respectively connected with the control unit to transmit detected currents flowing through the corresponding resistors to the control unit; the first resistor, the second resistor and the third resistor have the same resistance; the first current detector is configured to detect the total charging current; the second resistor is connected to the first resistor at one end and to the first rechargeable battery at the other end, so that the second current detector detects the charging current of the first rechargeable battery; and the third resistor is connected to the first resistor at one end and to the second rechargeable battery at the other end, so that the third current detector detects the charging current of the second rechargeable battery.

As a further improvement of the present disclosure, the charge control circuit further includes a mode switching unit, the mode switching unit being connected with the control unit to output a switching signal and transmit the switching signal to the control unit, thereby implementing switchover between operating modes of the charge control circuit; the operating modes include an operating mode I in which the charge control circuit charges the plurality of rechargeable batteries at the same time, and an operating mode II in which the charge control circuit charges the plurality of rechargeable batteries individually and sequentially; and the operating modes further include an operating mode III in which when the voltage adjustment circuit is configured to operate be on for a long time, if the temperatures or cell states of the plurality of rechargeable batteries are same, the plurality of rechargeable batteries are to be fully charged at the same time or output powers of the plurality of rechargeable batteries are equal.

As a further improvement of the present disclosure, the mode switching unit includes a toggle switch, and the switching signal is output by operating the toggle switch;

or the mode switching unit includes an automatic switching circuit, and the automatic switching circuit automatically outputs the switching signal after detecting a preset trigger condition.

As a further improvement of the present disclosure, a reverse cut-off rectifier tube is connected between the power input end and first switch, and a reverse cut-off rectifier tube is also connected between the power input end and the second switch.

To achieve the above object, the present disclosure further provides a charging device, including a housing and a charge control circuit installed in the housing, the charge control circuit being the aforementioned charge control circuit.

To achieve the above object, the present disclosure further provides a charging system, including a plurality of rechargeable batteries and a charge control circuit for charging the plurality of rechargeable batteries, the charge control circuit being the aforementioned charge control circuit.

The present disclosure has the following beneficial effects: the charge control circuit of the present disclosure is provided with the plurality of switches to correspondingly control the charging of the plurality of rechargeable batteries, thus achieving independent control of the individual rechargeable batteries; furthermore, the voltage adjustment circuit is provided between the first switch and the first power output end, such that when the detection unit detects that the rated voltages of the first rechargeable battery and the second rechargeable battery are not the same, the control unit may first controls the second switch to be closed and the second rechargeable battery is charged, and at the same time the control unit controls the first switch to be closed and activates the voltage adjustment circuit for voltage adjustment, so that the first rechargeable battery is charged simultaneously, and the charging currents of the first rechargeable battery and the second rechargeable battery are the same.

DETAILED DESCRIPTION

To make the object, technical solutions and advantages of the present disclosure clearer, the present disclosure will be described in detail below in conjunction with the accompanying drawings and specific embodiments.

Figure 1:
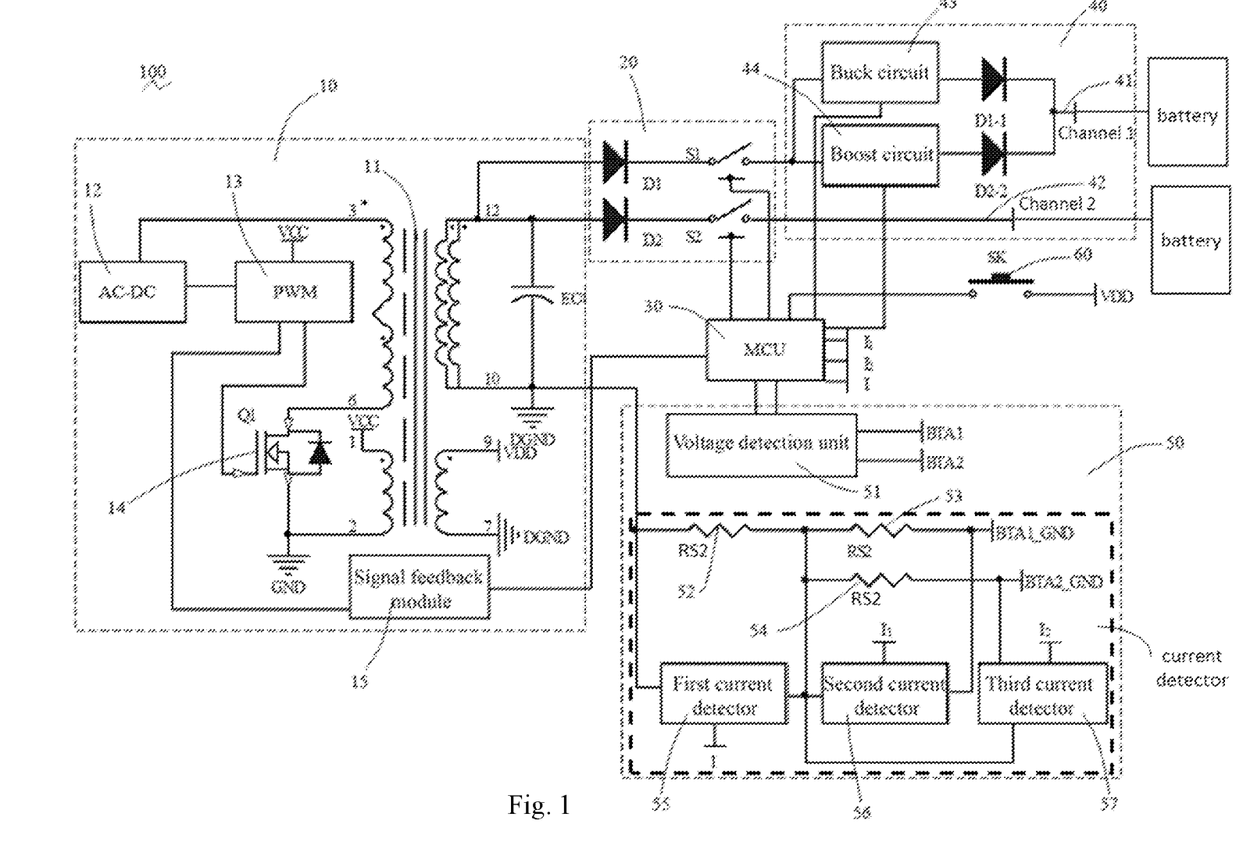
FIG. 1 is a schematic circuit diagram of a charge control circuit of the present disclosure.
Figure 2:
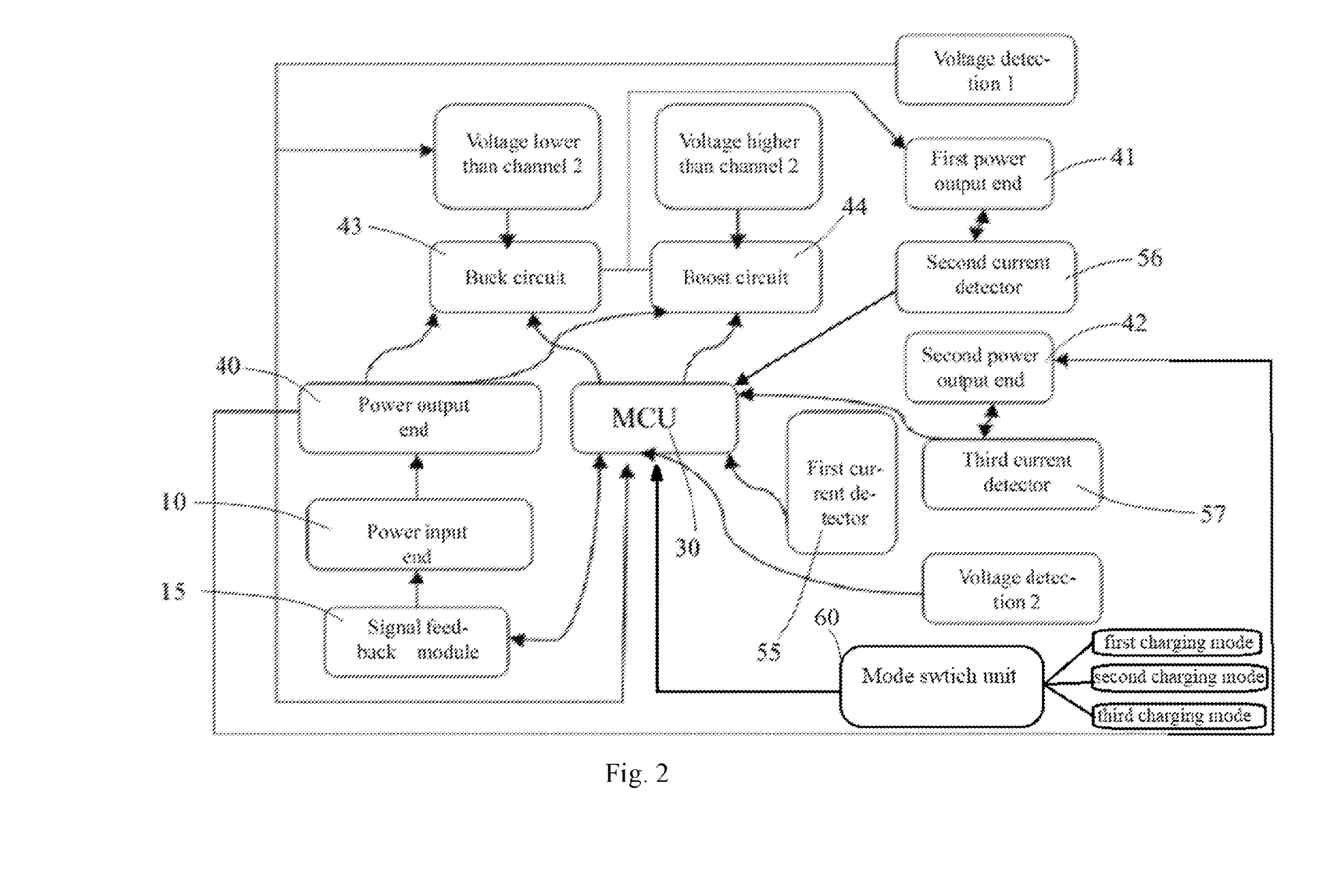
FIG. 2 is a structural block diagram of a charge control circuit of the present disclosure.

As shown in FIGS. 1 and 2, the present disclosure discloses a charge control circuit 100 for charging a plurality of rechargeable batteries. For ease of description, the plurality of rechargeable batteries is defined to include a first rechargeable battery BTA1 and a second rechargeable battery BTA2. The charge control circuit 100 includes a power input end 10, a switch unit 20, a control unit 30, a power output end 40 and a detection unit 50.

The power input end 10 includes a transformer 11, an AC-DC converter circuit 12 connected to the transformer 11, a primary-side PWM control chip 13 connected to the AC-DC converter circuit 12, and a switching device 14 connected to the primary-side PWM control chip 13. The main power output and voltage output of the charge control circuit 100 are achieved by output from one winding of the transformer 11 in a unified manner, see pin 10 to pin 12 in FIG. 1, and an output end of the transformer 11 outputs via two reverse cut-off rectifier tubes D1, D2 separately.

The switching device 14 is also connected with the transformer 11 to control the transformer 11 to be turned on or off. In this embodiment, the switching device 14 is a field effect tube Q1, and the field effect tube Q1 has a gate connected to the primary-side PWM control chip 13, a drain connected to a pin 6 of the transformer 11, and a source connected to a pin 2 of the transformer 11 and grounded. The primary-side PWM control chip 13 is also connected to the control unit 30 through a signal feedback module 15 to receive a control signal sent by the control unit 30.

The switch unit 20 is connected between the power input end 10 and the power output end 40, to control the power output end 40 to be turned on or off. Specifically, the switching unit 20 includes a first switch S1 connected to the reverse cut-off rectifier tube D1, and a second switch S2 connected to the reverse cut-off rectifier tube D2. The first switch S1 and the second switch S2 correspond to two power output ends 41 and 42, respectively, to control charging of two rechargeable batteries BTA1, BTA2 with different voltages. The first switch S1 and second switch S2 are electrically connected with the control unit 30, respectively, to perform a corresponding operation (closing or opening) according to a control signal sent by the control unit 30.

The reverse cut-off rectifier tube D1 is connected between the power input end 10 and the first switch S1, and the reverse cut-off rectifier tube D2 is connected between the power input end 10 and the second switch S2 to prevent current backflow.

The control unit 30 is a central control processor (MCU) for all signal control and feedback control, and all output adjustment of the entire charge control circuit 100 is implemented by the MCU. The MCU here is a common chip such as 8051, AT91M, MSP430 or COP800, which is not described in detail here.

The power output end 40 is configured to be connected with a plurality of rechargeable batteries to charge the plurality of batteries. Specifically, the power output end 40 includes a first power output end 41 connected to the first rechargeable battery BTA1 and a second power output end 42 connected to the second rechargeable battery BTA2; the first switch S1 is connected with the first power output end 41 to form a channel 1 for charging; and the second switch S2 is connected with the second power output end 42 to form a channel 2 for charging, such that when the first switch S1 is closed/opened, the channel 1 is turned on/off and the first power output end 41 can output a current normally, or the first power output end 41 is turned off without any output;

and when the second switch S2 is closed/opened, the channel 2 is turned on/off and the second power output end 42 can output a current normally, or the second power output end 42 is turned off without any output.

A voltage adjustment circuit is further connected between the first switch S1 and the first power output end 41, the voltage adjustment circuit including a buck circuit 43 and a boost circuit 44, the buck circuit 43 and boost circuit 44 being connected in parallel with each other between the first switch S1 and the first power output end 41. In this embodiment, the buck circuit 43 and boost circuit 44 are both DC-DC control circuits for adjusting a voltage applied to channel 1 until it matches the rated voltage of the first rechargeable battery BTA1.

The buck circuit 43 and the boost circuit 44 are respectively connected to the control unit 30, so that the control unit 30 can selectively activate the buck circuit 43 or the boost circuit 44 as needed. A reverse cut-off rectifier tube D1-1 is connected between the buck circuit 43 and the first power output end 41, and a reverse cut-off rectifier tube D2-2 is connected between the boost circuit 44 and the first power output end 41, to prevent backflow of a charging current.

The detection unit 50 is connected with the control unit 30, to detect rated voltages of the plurality of charging batteries and transmit a detection result to the control unit 30. For example, when the detection unit 50 detects that the rated voltages of the first rechargeable battery BTA1 and the second rechargeable battery BTA2 are not the same, the control unit 30 first controls the second switch S2 to be closed and the second rechargeable battery BTA2 is charged, and at the same time the control unit 30 controls the first switch S1 to be closed and activates the buck circuit 43 or the boost circuit 44 for voltage adjustment, so that the first rechargeable battery BTA1 is charged simultaneously. In this case, charging currents of the first rechargeable battery BTA1 and the second rechargeable battery BTA2 are the same.

Specifically, the detection unit 50 includes a voltage detection unit 51 and a current detection unit, wherein the voltage detection unit 51 is connected with the control unit 30, to detect the rated voltage of each charging battery and transmit a detection result to the control unit 30. The current detection unit is also connected with the control unit 30, to detect a total charging current I and a charging current of each rechargeable battery and transmit a detection result to the control unit 30.

The current detection unit includes a first resistor (RS2) 52 connected to the power input end 10, a second resistor (RS2) 53 connected in series with the first resistor 52, a third resistor (RS2) 54 connected in parallel with the second resistor 53, a first current detector 55 connected to two ends of the first resistor 52, a second current detector 56 connected to two ends of the second resistor 53, and a third current detector 57 connected to two ends of the third resistor 54, wherein the first resistor 52, the second resistor 53 and the third resistor 54 have same resistance, such that a current flowing through the second resistor 53 shall be equal to a current flowing through the third resistor 54, and a current flowing through the first resistor 52 shall be equal to the current flowing through the second resistor 53 plus the current flowing through the third resistor 54. The first current detector 55, the second current detector 56 and the third current detector 57 are respectively connected with the control unit 30 to transmit detected currents flowing through the corresponding resistors to the control unit 30.

Preferably, the first current detector 55 is configured to detect the current flowing through the first resistor 52 (i.e. the total charging current I); the second resistor 53 is connected to the first resistor 52 at one end and to the first rechargeable battery BTA1 at the other end, and the second current detector 56 is configured to detect the current flowing through the second resistor 53 (i.e. the charging current $I_1$ of the first rechargeable battery BTA1); and the third resistor 54 is connected to the first resistor 52 at one end and to the second rechargeable battery BTA2 at the other end, and the third current detector 57 is configured to detect the current flowing through the third resistor 54 (i.e. the charging current $I_2$ of the second rechargeable battery BTA2).

Theoretically, the charging current $I_1$ of the first rechargeable battery BTA1 should be equal to the charging current $I_2$ of the second rechargeable battery BTA2, and the sum of these two charging currents should be equal to the total charging current I, i.e., $I_1=I_2$, and $I=I_1+I_2$; therefore, when there is a current difference between the charging current $I_1$ of the first rechargeable battery BTA1 and the charging current $I_2$ of the second rechargeable battery BTA2, it indicates that the charge control circuit 100 is abnormal, and at this time, the control unit 30 may immediately control the first switch S1 and the second switch S2 to be opened and stop supplying power to the first rechargeable battery BTA1 and the second rechargeable battery BTA2.

The charge control circuit 100 further includes a mode switching unit 60, the mode switching unit 60 being connected with the control unit 30 to output a switching signal and transmit the switching signal to the control unit 30, thereby implementing switchover between operating modes of the charge control circuit 100. The switching signal output by the mode switching unit 60 is implemented in a hardware manner or in a software manner. The hardware manner is preferably that the mode switching unit 60 includes a toggle switch SK, and the switching signal is output by operating the toggle switch SK; and the software manner is preferably that the mode switching unit 60 includes an automatic switching circuit, and the automatic switching circuit automatically outputs the switching signal after detecting a preset trigger condition. In this embodiment, the mode switching unit 60 outputs the switching signal in a hardware manner (i.e., toggle switch SK).

Figure 3:
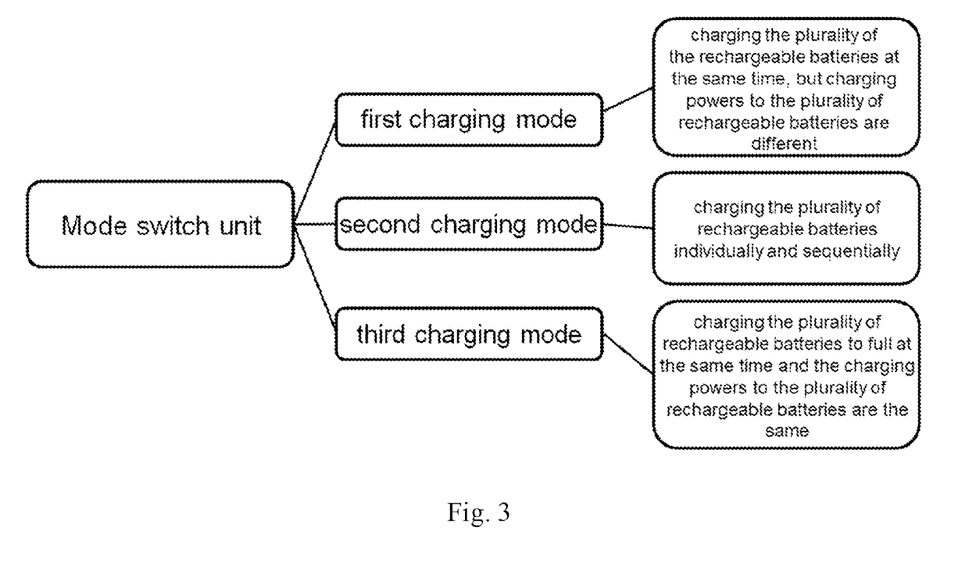
FIG. 3 is schematic diagram of three charging modes of the present disclosure.

Operating modes of the charge control circuit 100 of the present disclosure may be preset in advance by the toggle switch SK, and there are three different operating modes, respectively as follows:

operating mode I: the charge control circuit 100 charges a plurality of rechargeable batteries at the same time, but does not necessarily stops charging the batteries at the same time, which depends on the states of the batteries;

operating mode II: the charge control circuit 100 charges a plurality of rechargeable batteries individually and sequentially; to save time, one channel (e.g., channel 1) may be used to first charge a corresponding rechargeable battery at full power output, and after the charging is complete, a second channel (e.g., channel 2) may be used to charge another rechargeable battery at full power output, and so on, to achieve an effect of fast charging; and operating mode III: operating states of the buck circuit 43 and boost circuit 44 are adjusted so as not to operate in a high-frequency state, but operate in an On state for a long time; in this way, when the power output end 40 is connected to a plurality of rechargeable batteries at the same time, if the temperatures or cell states of the plurality of rechargeable batteries are the same, the plurality of rechargeable batteries can be fully charged at the same time or output powers of the plurality of rechargeable batteries are equal.

The above three operating modes may be selected by manual switching, and judgment regarding charging status can be made at any time according to the states of the rechargeable batteries. The following description is mainly directed to working mode I as an example.

In the operating mode I, when the first power output end 41 and the second power output end 42 are connected to the first rechargeable battery BTA1 and the second rechargeable battery BTA2 respectively, and the rated voltages of the first rechargeable battery BTA1 and the second rechargeable battery BTA2 are not the same, for example, the rated voltage of the second rechargeable battery BTA2 being higher and the rated voltage of the first rechargeable battery BTA1 being lower, the control unit 30 first controls the second switch S2 to be closed and the second rechargeable battery BTA2 is charged, and at the same time, the voltage detection unit 51 detects that the rated voltage of the first rechargeable battery BTA1 is lower, and the control unit 30 controls the first switch S1 to be closed and activates the buck circuit 43 to reduce a higher voltage introduced to the channel 1 down to a voltage suitable for the first rechargeable battery BTA1 and charging is started, at which time the first power output end 41 (channel 1) and the second power output end 42 (channel 2) in the whole charge control circuit 100 have voltage outputs at the same time, and output currents of the first power output end 41 (channel 1) and the second power output end 42 (channel 2) are controlled to be the same.

In such an operating mode, the first power output end 41 and the second power output end 42 can output power at the same time without mutual influence, and when the states of the two rechargeable batteries are not same, it is completely possible to adjust each channel independently such that the charging currents of the two rechargeable batteries are the same.

It may be appreciated that the above-mentioned charge control circuit 100 may be installed in a housing (not shown), and thus form a charging device together with the housing. Furthermore, the charging device may also form a charging system together with a plurality of rechargeable batteries.

In summary, the charge control circuit 100 of the present disclosure is provided with the plurality of switches to correspondingly control the charging of the plurality of rechargeable batteries, thus achieving independent control of individual rechargeable batteries; furthermore, the voltage adjustment circuit is provided between the first switch S1 and the first power output end 41, such that when the detection unit 50 detects that the rated voltages of the first rechargeable battery BTA1 and the second rechargeable battery BTA2 are not same, the control unit 30 may first controls the second switch S2 to be closed and the second rechargeable battery BTA2 is charged, and at the same time the control unit 30 controls the first switch S1 to be closed and activates the voltage adjustment circuit for voltage adjustment, so that the first rechargeable battery BTA1 is charged simultaneously, and the charging currents of the first rechargeable battery BTA1 and the second rechargeable battery BTA2 are same.

Compared with the prior art, the charge control circuit 100 of the present disclosure can achieve simultaneous charging of a plurality of or a plurality of groups of rechargeable batteries by using only one AC-DC converter circuit 12. Of course, theoretically, the number of charging interfaces may be increased indefinitely to charge more rechargeable batteries simultaneously. The present disclosure may be applied in a high-end multi-channel lithium-ion battery charging system to achieve single power supply AC-DC conversion and multi-port DC-DC output control, which solves the problems that charger products when outputting in multiple channels have inconsistent output control and that charger products are not able to freely control the distribution of output currents when they have different loads.

The above embodiments are only used for illustrating the technical solutions of the present disclosure rather than for limitations. Although the present disclosure is described in detail with reference to the preferred embodiments, those of ordinary skill in the art should understand that they still can make modifications or equivalent substitutions to the technical solutions of the present disclosure without departing from the spirit and scope of the technical solutions of the present disclosure.

The invention claimed is:

1. A charge control circuit, comprising:
a power input end;
a power output end configured to be connected with batteries;
a switch unit connected between the power input end and the power output end, to control the power output end;
a control unit electrically connected with the switch unit, to control the switch unit; and
a detection unit connected with the control unit, to detect rated voltages of the batteries and send a detection signal to the control unit,
wherein the batteries are a plurality of rechargeable batteries and at least comprise a first rechargeable battery and a second rechargeable battery;
the power output end comprises a first power output end connected to the first rechargeable battery, and a second power output end connected to the second rechargeable battery;
the switch unit comprises a first switch connected to the first power output end, and a second switch connected to the second power output end;
a voltage adjustment circuit is further connected between the first switch and the first power output end; and
when the detection unit detects that the rated voltages of the first rechargeable battery and the second rechargeable battery are not the same, the control unit controls the second switch to be closed and the second rechargeable battery is charged, and at the same time the control unit controls the first switch to be closed and activates the voltage adjustment circuit for voltage adjustment, so that the first rechargeable battery is charged simultaneously, and charging currents of the first rechargeable battery and the second rechargeable battery are the same;
wherein the charge control circuit further includes a mode switching unit, connected with the control unit to output a switching signal and transmit the switching signal to the control unit, wherein the charge control circuit comprises three charging modes,
a first charging mode is charging the plurality of rechargeable batteries at the same time but charging powers to the plurality of rechargeable batteries are different,
a second charging mode is charging the plurality of rechargeable batteries individually and sequentially, a third charging mode is charging the plurality of rechargeable batteries to full at the same time and the charging powers to the plurality of rechargeable batteries are the same, the control circuit is controlled to select one of the three charging modes.

2. The charge control circuit according to claim 1, wherein a reverse cut-off rectifier tube is connected between the power input end and first switch, and a reverse cut-off rectifier tube is also connected between the power input end and the second switch.

3. The charge control circuit according to claim 1, wherein the voltage adjustment circuit comprises a buck circuit and a boost circuit, the buck circuit and boost circuit being respectively connected with the control unit, and the buck circuit and boost circuit being connected in parallel with each other between the first switch and the first power output end.

4. The charge control circuit according to claim 3, wherein a reverse cut-off rectifier tube is connected between the buck circuit and the first power output end, and a reverse cut-off rectifier tube is also connected between the boost circuit and the first power output end, the buck circuit and boost circuit being both DC-DC control circuits.

5. The charge control circuit according to claim 1, wherein the detection unit comprises a voltage detection unit and a current detection unit; the voltage detection unit is connected with the control unit, to detect the rated voltage of each charging battery and transmit a detection result to the control unit; and the current detection unit is connected with the control unit, to detect a total charging current and a charging current of each rechargeable battery and transmit a detection result to the control unit.

6. The charge control circuit according to claim 5, wherein the current detection unit comprises a first resistor connected to the power input end, a second resistor connected in series with the first resistor, a third resistor connected in parallel with the second resistor, a first current detector connected to two ends of the first resistor, a second current detector connected to two ends of the second resistor, and a third current detector connected to two ends of the third resistor, wherein the first current detector, the second current detector, and the third current detector are respectively connected with the control unit to transmit detected currents flowing through the corresponding resistors to the control unit; the first resistor, the second resistor and the third resistor have the same resistance; the first current detector is configured to detect the total charging current; the second resistor is connected to the first resistor at one end and to the first rechargeable battery at the other end, so that the second current detector detects the charging current of the first rechargeable battery; and the third resistor is connected to the first resistor at one end and to the second rechargeable battery at the other end, so that the third current detector detects the charging current of the second rechargeable battery.

7. The charge control circuit according to claim 6, wherein the mode switching unit comprises a toggle switch, and the switching signal is output by operating the toggle switch;

or the mode switching unit comprises an automatic switching circuit, and the automatic switching circuit automatically outputs the switching signal after detecting a preset trigger condition.

8. A charging device, comprising a housing and a charge control circuit installed in the housing, wherein the charge control circuit comprises:

a power input end;

a power output end configured to be connected with batteries;

a switch unit connected between the power input end and the power output end, to control the power output end;

a control unit electrically connected with the switch unit, to control the switch unit; and a detection unit connected with the control unit, to detect rated voltages of the batteries and send a detection signal to the control unit, wherein the batteries are a plurality of rechargeable batteries and at least comprise a first rechargeable battery and a second rechargeable battery; the power output end comprises a first power output end connected to the first rechargeable battery, and a second power output end connected to the second rechargeable battery; the switch unit comprises a first switch connected to the first power output end, and a second switch connected to the second power output end; a voltage adjustment circuit is further connected between the first switch and the first power output end; and when the detection unit detects that the rated voltages of the first rechargeable battery and the second rechargeable battery are not the same, the control unit controls the second switch to be closed and the second rechargeable battery is charged, and at the same time the control unit controls the first switch to be closed and activates the voltage adjustment circuit for voltage adjustment, so that the first rechargeable battery is charged simultaneously, and charging currents of the first rechargeable battery and the second rechargeable battery are the same;

wherein the charge control circuit further includes a mode switching unit, connected with the control unit to output a switching signal and transmit the switching signal to the control unit, wherein the charge control circuit comprises three charging modes, a first charging mode is charging the plurality of rechargeable batteries at the same time but charging powers to the plurality of rechargeable batteries are different, a second charging mode is charging the plurality of rechargeable batteries individually and sequentially, a third charging mode is charging the plurality of rechargeable batteries to full at the same time and the charging powers to the plurality of rechargeable batteries are the same, the control circuit is controlled to select one of the three charging modes.

9. A charging system, comprising a plurality of rechargeable batteries and a charge control circuit for charging the plurality of rechargeable batteries, wherein the charge control circuit comprises:

a power input end;

a power output end configured to be connected with the plurality of rechargeable batteries to charge the plurality of rechargeable batteries;

a switch unit connected between the power input end and the power output end, to control the power output end to be turned on or off;

a control unit electrically connected with the switch unit, to control the switch unit to be closed or opened; and a detection unit connected with the control unit, to detect rated voltages of the plurality of rechargeable batteries and send a detection signal to the control unit, wherein the plurality of rechargeable batteries at least comprises a first rechargeable battery and a second rechargeable battery; the power output end comprises a first power output end connected to the first rechargeable battery, and a second power output end connected to the second rechargeable battery; the switch unit comprises a first switch connected to the first power output end, and a second switch connected to the second power output end; a voltage adjustment circuit is further connected between the first switch and the first power output end; and when the detection unit detects that the rated voltages of the first rechargeable battery and the second rechargeable battery are not the same, the control unit controls the second switch to be closed and the second rechargeable battery is charged, and at the same time the control unit controls the first switch to be closed and activates the voltage adjustment circuit for voltage adjustment, so that the first rechargeable battery is charged simultaneously, and charging currents of the first rechargeable battery and the second rechargeable battery are the same;

wherein the charge control circuit further includes a mode switching unit, connected with the control unit to output a switching signal and transmit the switching signal to the control unit, wherein the charge control circuit comprises three charging modes, a first charging mode is charging the plurality of rechargeable batteries at the same time but charging powers to the plurality of rechargeable batteries are different, a second charging mode is charging the plurality of rechargeable batteries individually and sequentially, a third charging mode is charging the plurality of rechargeable batteries to full at the same time and the charging powers to the plurality of rechargeable batteries are the same, the control circuit is controlled to select one of the three charging modes.

* * * * *